United States Patent
Liu et al.

(10) Patent No.: US 12,235,447 B2
(45) Date of Patent: Feb. 25, 2025

(54) FREEFORM OPTICAL LENS CONSTRUCTION FOR NEAR-EYE DISPLAYS

(71) Applicant: Huawei Technologies Co., Ltd., Shenzhen (CN)

(72) Inventors: Zhiqiang Liu, Plano, TX (US); Angus Wu, Plano, TX (US); Jiang Li, Plano, TX (US); Peng Zhang, Plano, TX (US); Akash Arora, Plano, TX (US); Gangok Lee, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 609 days.

(21) Appl. No.: 17/484,501

(22) Filed: Sep. 24, 2021

(65) Prior Publication Data
US 2022/0011583 A1    Jan. 13, 2022

Related U.S. Application Data

(63) Continuation of application No. PCT/US2019/025633, filed on Apr. 3, 2019.

(51) Int. Cl.
*G02B 27/01* (2006.01)
*G02B 3/02* (2006.01)

(52) U.S. Cl.
CPC .......... *G02B 27/0172* (2013.01); *G02B 3/02* (2013.01); *G02B 2027/0178* (2013.01)

(58) Field of Classification Search
CPC ........ G02B 27/0172; G02B 2027/0178; G02B 27/017
See application file for complete search history.

(56) References Cited

U.S. PATENT DOCUMENTS

| | | | |
|---|---|---|---|
| 6,147,807 A * | 11/2000 | Droessler | G02B 27/0172 359/633 |
| 6,335,711 B1 | 1/2002 | Maeda et al. | |
| 6,388,640 B1 | 5/2002 | Chigira et al. | |
| 6,396,639 B1 * | 5/2002 | Togino | G02B 17/0816 359/640 |

(Continued)

FOREIGN PATENT DOCUMENTS

| CN | 103439793 A | 12/2013 |
|---|---|---|
| CN | 107422483 A | 12/2017 |

(Continued)

OTHER PUBLICATIONS

Min, Z., et al., "Glasses Fitting Technology (vol. II) / Higher Vocational Education Textbook," Paperback, Amazon.com, May 31, 2015, 4 pages.

(Continued)

*Primary Examiner* — Ryan D Howard
(74) *Attorney, Agent, or Firm* — Conley Rose, P.C.

(57) ABSTRACT

A near-eye display (NED), comprising an augmented reality (AR) lens comprising a main prism lens and a see-through corrector lens, wherein the AR lens comprises a bottom edge that tapers toward a blunt tip, and a micro-display panel coupled to the AR lens and comprising a processor configured to process content for display to a user wearing the NED, and a display coupled to the processor and configured to project the content to the AR lens.

20 Claims, 11 Drawing Sheets

(56) References Cited

U.S. PATENT DOCUMENTS

| | | | |
|---|---|---|---|
| 2002/0105738 A1* | 8/2002 | Kobayashi | G02B 17/0848 |
| | | | 359/834 |
| 2004/0099972 A1 | 5/2004 | Morris | |
| 2012/0081800 A1 | 4/2012 | Cheng et al. | |
| 2015/0185477 A1 | 7/2015 | Hiraide | |

FOREIGN PATENT DOCUMENTS

| | | |
|---|---|---|
| EP | 1202566 A1 | 5/2002 |
| JP | 2015125221 A | 7/2015 |
| WO | 2012088478 A1 | 6/2012 |
| WO | 2018035842 A1 | 3/2018 |

OTHER PUBLICATIONS

Li, L., et al., "Practical techniques for optical design," Jan. 2019, 1 page, with English Abstract.

Min, Z., et al., "Glasses Fitting Technology (vol. II)," Higher Vocational Education Textbook, May 31, 2015, p. 9.

English Translation of Min, Z., et al., "Glasses Fitting Technology (vol. II)," Higher Vocational Education Textbook, May 31, 2015, p. 9.

\* cited by examiner

FREEFORM OPTICAL LENS CONSTRUCTION FOR NEAR-EYE DISPLAYS

CROSS-REFERENCE TO RELATED APPLICATIONS

This application is a continuation of International Application No. PCT/US2019/025633, filed Apr. 3, 2019 by Futurewei Technologies and titled "Freeform Optical Lens Construction for Near-Eye Displays," which incorporated herein by reference in its entirety

TECHNICAL FIELD

The disclosed embodiments relate to near-eye displays in general and optical architectures for near-eye displays in particular.

BACKGROUND

Near-eye displays (NEDs), which may also be referred to as head mounted displays (HMDs) or smart glasses, provide augmented reality (AR), mixed reality (MR), or virtual reality (VR) experiences by projecting computer-generated images into users' eyes to create virtual images in the users' field of views (FOVs). The computer-generated images are constructive, meaning they add to the users' natural environments, or the computer-generated images are destructive, meaning they mask the users' natural environments. The natural environments may be what the users see in their natural FOV. Thus, the users may see a combination of both the virtual images and the users' natural FOVs.

SUMMARY

According to a first aspect of the present disclosure, there is provided a near-eye display (NED), comprising an augmented reality (AR) lens comprising a main prism lens and a see-through corrector lens, wherein the AR lens comprises a bottom edge that tapers toward a blunt tip, and a micro-display panel coupled to the AR lens and comprising a processor configured to process content for display to a user wearing the NED, and a display coupled to the processor and configured to project the content to the AR lens.

In a first implementation of the NED according to the first aspect, the AR lens comprises an optical area that displays the content and light from an external environment to the user, wherein the optical area comprises a portion of the main prism lens, the see-through corrector lens, and the bottom edge of the AR lens.

In a second implementation of the NED according to the first aspect or any preceding implementation of the first aspect, both sides of an optical area of the AR lens and an entire length of the bottom edge of the AR lens is tapered.

In a third implementation of the NED according to the first aspect or any preceding implementation of the first aspect, the optical area and the bottom edge of the AR lens comprises a transparent plastic material.

In a fourth implementation of the NED according to the first aspect or any preceding implementation of the first aspect, the bottom edge is tapered as a triangular prism, a trapezoidal prism, or a semi-hemisphere.

In a fifth implementation of the NED according to the first aspect or any preceding implementation of the first aspect, the bottom edge of the optical area of the AR lens is detachably attached to a beveled edge that tapers.

In a sixth implementation of the NED according to the first aspect or any preceding implementation of the first aspect, a beveled edge at least partially surrounds the optical area of the AR lens.

In a seventh implementation of the NED according to the first aspect or any preceding implementation of the first aspect, the content passes through a display corrector lens of the AR lens and the main prism lens, before being presented to the user with light from the external environment.

In an eighth implementation of the NED according to the first aspect or any preceding implementation of the first aspect, tapering the bottom edge or the optical area of the AR lens reduces an apparent thickness of the AR lens.

According to a second aspect of the present disclosure, there is provided a method for manufacturing a NED. The method comprises providing an AR lens comprising a main prism lens and a see-through corrector lens, attaching a frame of the NED to the AR lens, and tapering a bottom edge of the AR lens to a blunt tip.

In a first implementation of the method according to the second aspect, tapering the bottom edge of the AR lens proximate to the see-through corrector lens comprises attaching a beveled edge to an optical area of the AR lens, wherein the optical area displays the content and light from an external environment to a user, and wherein the optical area comprises a portion of the main prism lens, the see-through corrector lens, and the bottom edge of the AR lens.

In a second implementation of the method according to the second aspect or any preceding implementation of the second aspect, the beveled edge is attached to the optical area of the AR lens using glue.

In a third implementation of the method according to the second aspect or any preceding implementation of the second aspect, tapering the bottom edge of the AR lens proximate to the see-through corrector lens comprises polishing the sides and the bottom edge of an optical area of the AR lens, wherein the optical area displays the content and light from an external environment to a user, and wherein the optical area comprises a portion of the main prism lens, the see-through corrector lens, and the bottom edge of the AR lens.

According to a third aspect of the present disclosure, there is provided an NED, comprising an AR lens comprising a display corrector lens, a main prism lens, and a see-through corrector lens, wherein the AR lens comprises a bottom edge that tapers toward a blunt tip, and a micro-display panel coupled to the AR lens and comprising a processor configured to process content for display to a user wearing the NED through the AR lens.

In a first implementation of the NED according to the third aspect, the AR lens comprises an optical area that displays the content and light from an external environment to the user, wherein the optical area comprises a portion of the main prism lens, the see-through corrector lens, and the bottom edge of the AR lens.

In a second implementation of the NED according to the third aspect or any preceding implementation of the third aspect, both sides of an optical area of the AR lens proximate to the bottom edge and an entire width of the bottom edge of the AR lens is tapered.

In a third implementation of the NED according to the third aspect or any preceding implementation of the third aspect, the optical area of the AR lens comprises a transparent plastic material.

In a fourth implementation of the NED according to the third aspect or any preceding implementation of the third aspect, the bottom edge is tapered as a triangular prism, a trapezoidal prism, or a semi-hemisphere.

In a fifth implementation of the NED according to the third aspect or any preceding implementation of the third aspect, the optical area of the AR lens is detachably attached to a beveled edge that tapers at the bottom edge of the AR lens.

In a sixth implementation of the NED according to the third aspect or any preceding implementation of the third aspect, a beveled edge at least partially surrounds the optical area of the AR lens.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An NED, which is a specialized, head-mounted eyepiece device that provides a simulated visual environment through a freeform optics lens, allows the user to see both a digital display of produced content and the natural environment or external environment. Typically, the AR lens included in the NED is a freeform lens, which is relatively thick when compared to standard sunglasses or prescription glasses. For example, the freeform lens may have a thickness of about 5 mm to about 15 mm. A typical freeform lens appears thick and bulky with abrupt and sharp edges that, when worn by the user, rests relatively close to a user's face and eyes. Therefore, the typical freeform lenses included in an NED are uncomfortable for the user, potentially hazardous to the user, and are unappealing to customers considering whether to purchase the NED.

The embodiments disclosed herein are directed to modifying the freeform lens to include a blunt bottom edge, instead of an abrupt edge, at the optical portion of the lens closest to the eyes of the user wearing the NED. The blunt bottom edge will reduce the apparent thickness of the freeform lens, while also enabling a more comfortable and safe user experience when handling the NED.

Figure 1A:
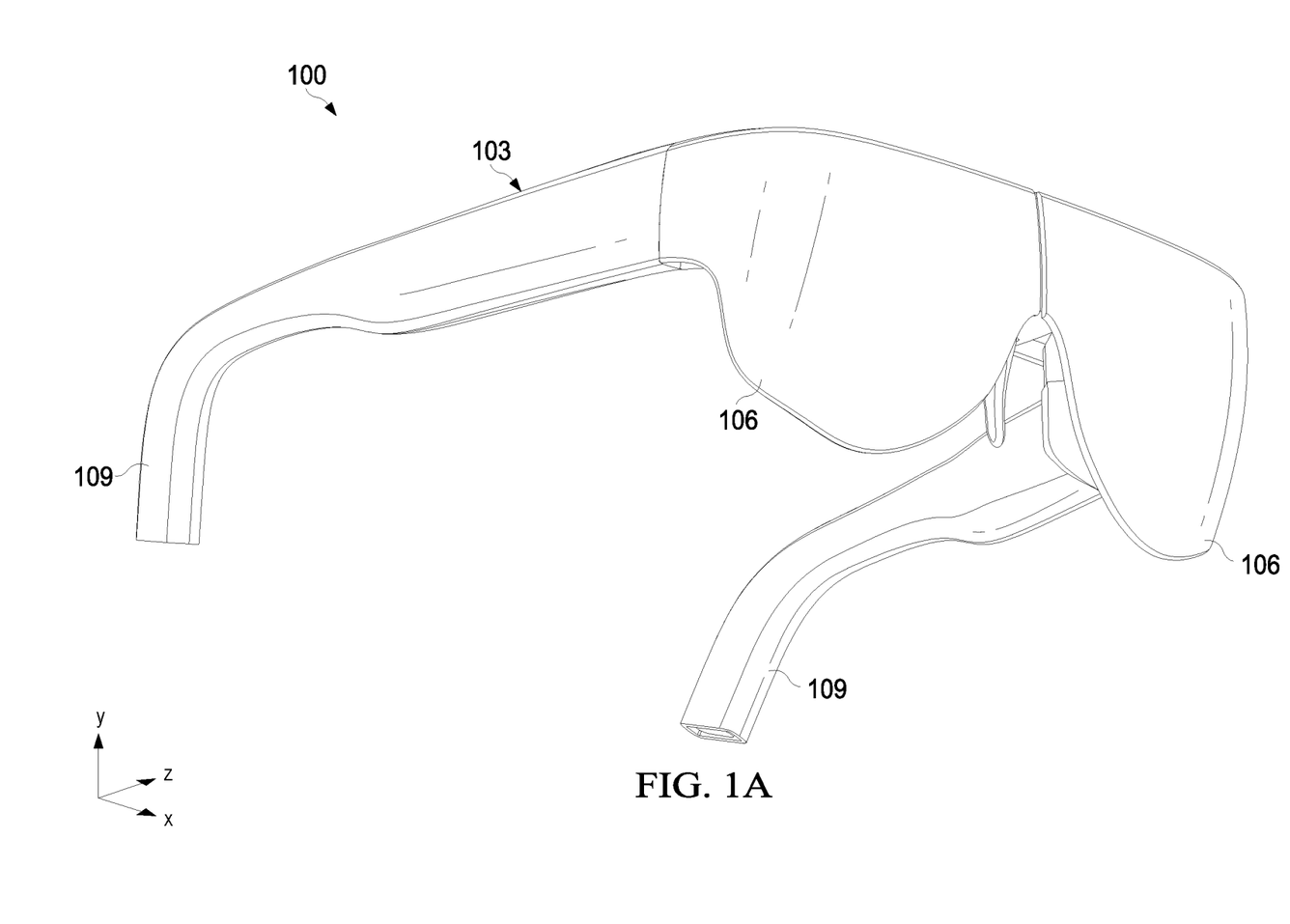
FIG. 1A is a diagram illustrating an exterior of an NED according to various embodiments of the disclosure.
Figure 1B:
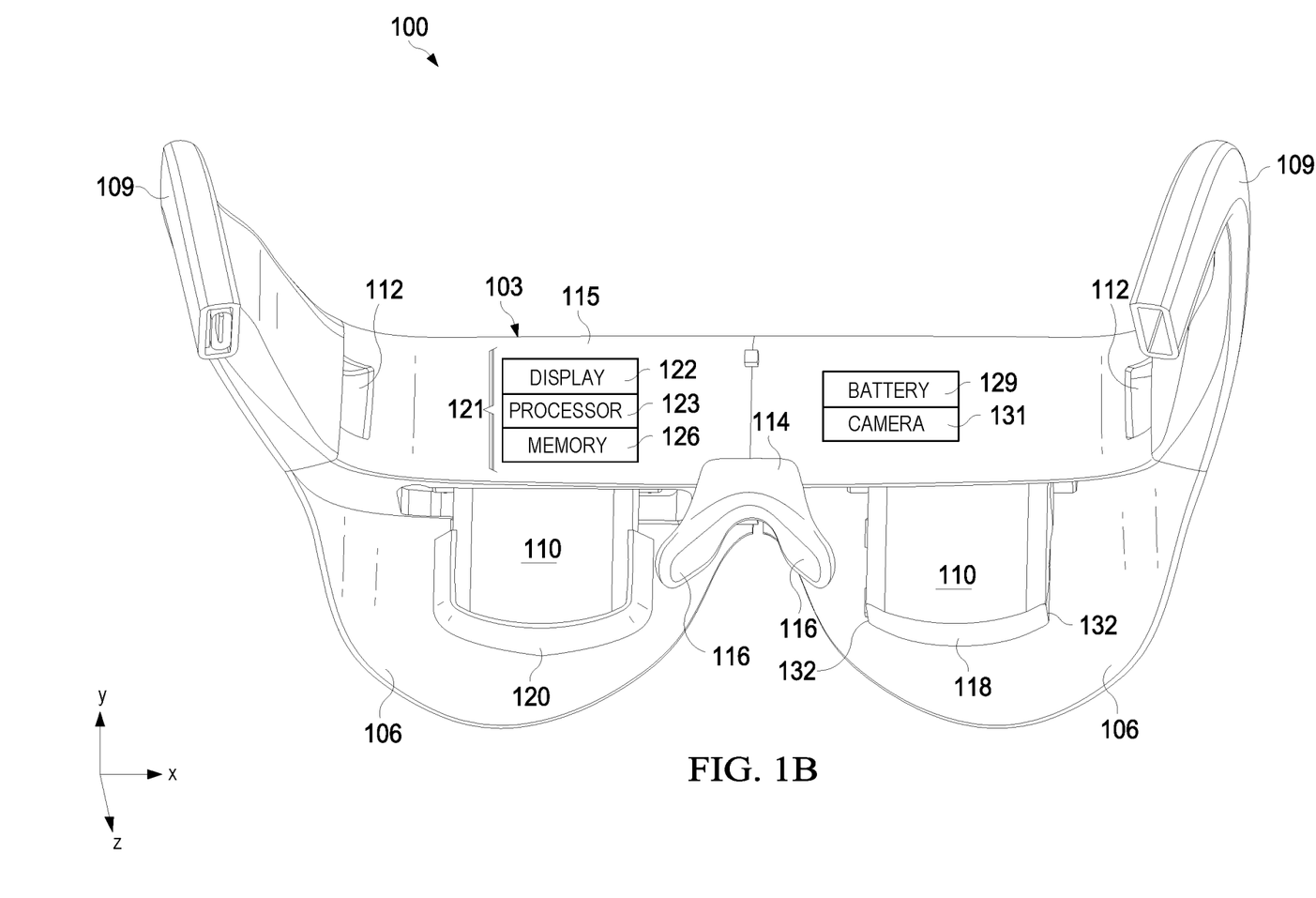
FIG. 1B is a diagram illustrating an interior of the NED according to various embodiments of the disclosure.

FIGS. 1A-B are diagrams illustrating the exterior and interior of an NED 100 according to various embodiments of the disclosure. In particular, FIG. 1A is a diagram illustrating an exterior surface of an NED 100, and FIG. 1B is a diagram illustrating an interior of the NED 100, which faces the user wearing the NED 100.

As shown by FIG. 1, the NED 100 comprises a frame 103 and two outer lenses 106. The frame 103 secures the NED 100 to a user's head. As shown by FIG. 1, the frame 103 includes temples 109, which are arms on the sides of the frame 103 that extend from a hinge on the frame 103 and over the ears of a user wearing the NED 100 to keep the NED 100 on the user's face.

Frame 103 also secures or provides structural support for the various components of the NED 100, such as the two outer lenses 106. In an embodiment, the two outer lenses 106 are molded using plastic injection molding and bonded onto the frame 103 using glue, or integrally formed with the frame 103. In an embodiment, the two outer lenses 106 are inserted and held in place with the frame 103 using eye wires that extend around each outer lens 106. An outer lens 106 is made of transparent, partially transparent, or tinted material, such as, for example, a partially transparent plastic material and/or a polycarbonate material. In some embodiments, a user wearing the NED 100 may see through the outer lenses 106 to view an external environment surrounding the user and/or light from the external environment. As will be further described below with reference to FIG. 1B, NED 100 further includes two AR lenses positioned on the inside (e.g., closer to the user's eye) of the NED 100, in which the AR lenses superimpose content produced by a micro-display panel of the NED 100 with the external environment surrounding the user.

FIG. 1B is a diagram illustrating an interior of an NED 100 according to various embodiments of the disclosure. As shown in FIG. 1B, NED 100 additionally includes two AR lenses 110, and frame 103 additionally includes hinges 112, a connecting bridge 114, and a holder 115. Each AR lens 110 is an optical glass, which allows images to reflect or refract within. In an embodiment, each AR lens 110 is a freeform optical lens, which is further described below with reference to FIGS. 2A-D.

The hinges 112 interconnect the temples 109 to the holder 115 on the frame 103. The connecting bridge 114 is an arched piece in the center of the frame 103 that includes two nose pads 116, which rest on the user's nose when the user wears the NED 100.

The holder 115 supports one or more component parts of the NED 100, such as, for example, a battery 129, a camera 131, and/or a micro-display panel 121. In an embodiment, a micro-display panel 121 is a panel that may include a display 122, a processor 123, and/or a memory 126. It should be appreciated that the NED 100 may include other components not explicitly shown in FIG. 1B, each of which may be part of the micro-display panel 121 and/or supported by the holder 115.

The display 122 of the micro-display panel 121 is an emissive micro-display, such as an organic light-emitting diode (LED) (OLED), a micro light-emitting diode (µLED), a liquid crystal on silicon (LCOS) display, a digital light processing (DLP) display, or another display that generates images and projects the images into the AR lens 110. The processor 123 may be a central processor unit (CPU), including one or more multi-core processors, and is coupled to the memory 126. In an embodiment, the processor 123 is configured to generate images, frames, or videos that are passed through the AR lenses 110 and superimposed with the external environment or light from the external environment. In some cases, the micro-display panel 121 may refer to both the display 122 and the processor 123. The memory 126 may be a cache for temporarily storing content, e.g., a random access memory (RAM). The memory 126 may also include a long-term storage for storing content relatively longer, e.g., a read-only memory (ROM). In an embodiment, the memory 126 stores the content produced by the processor 123 or captured by the camera 131. The battery 129 may be the power source for the NED 100. In some cases, the temples 109 may also be used to support and protect component parts of the NED 100.

As shown by FIG. 1B, the AR lenses 110 are positioned inside of the outer lenses 106. The AR lenses 110 are also attached to the frame 103, the construction of which is further described below with reference to FIGS. 2A-B. FIG. 1B shows two AR lenses 110. The AR lens 110 on the right shows a typical bottom edge 118 having sharp edges with about 90 degree (°) angles, while the AR lens 110 on the left shows an embodiment of blunt bottom edge 120 with rounded or smooth edges. In an embodiment, the blunt bottom edge 120 tapers down in a slope that is parallel to the face of a user wearing the NED 100. As shown by FIG. 1B, the AR lens 110 on the left includes smoothed edges that are angled with a rounded slope substantially parallel to the face of a user wearing the NED 100. Additional detail regarding the blunted bottom edge 120 is further described below with reference to FIGS. 4-7.

When a user wears an NED 100, a bottom edge 118 of an AR lens 110 rests relatively close to a user's face and eyes. However, the bottom edge 118 of an AR lens 110 typically includes sharp edges having about 90° angles. The sharp edges of the AR lenses 110 may occasionally injure or scratch the user's face when the user wears the NED 100. In addition, the sharp edges of the AR lenses 110 contribute to the thick and bulky appearance of the AR lenses, in terms of depth (in the Z direction).

Disclosed herein are embodiments that taper the bottom edge 118 of the AR lens 110 to create a blunt bottom edge 120, as shown by the left AR lens 110 in FIG. 1B, which is rounded, smooth, and/or blunt to prevent the user from being injured by the AR lens 110. In addition, the blunt bottom edge 120 of the AR lens 110 enables the AR lens 110 to appear thinner in the Z direction. In some embodiments, the blunt bottom edge 120 is not only smoothed or rounded along the bottom edge 118 in the Y direction, but also smoothed or rounded along the sidewalls 132 of the AR lens 110 in the X direction. Additional details regarding the blunt bottom edge 120 is further described below with reference to FIGS. 3A-B, 4A-B, 5A-D, 6A-B, and 7A-B.

Figure 2A:
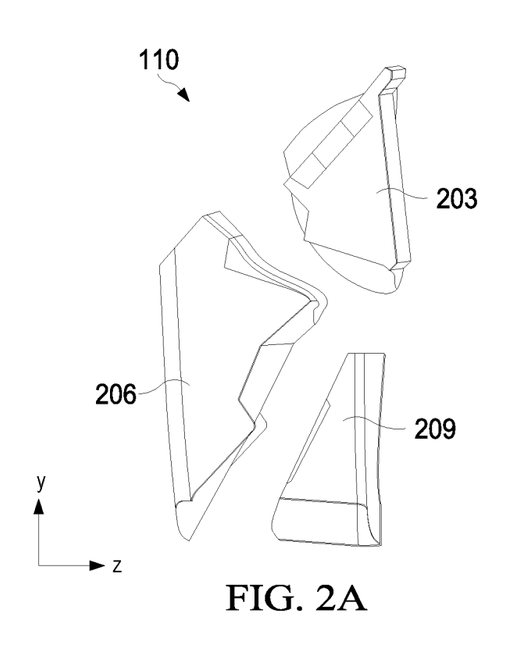
FIG. 2A is a diagram illustrating an AR lens within the NED according to various embodiments of the disclosure
Figure 2B:
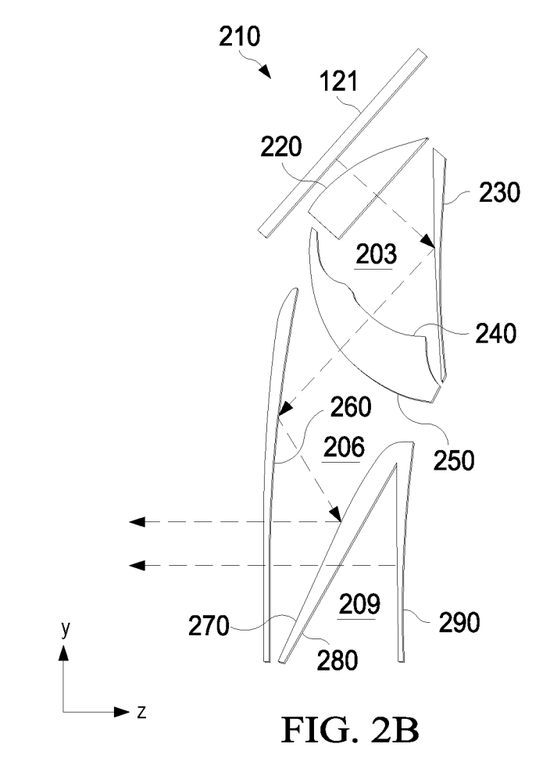
FIG. 2B is a ray diagram illustrating a display path within the AR lens according to various embodiments of the disclosure.
Figure 2C:
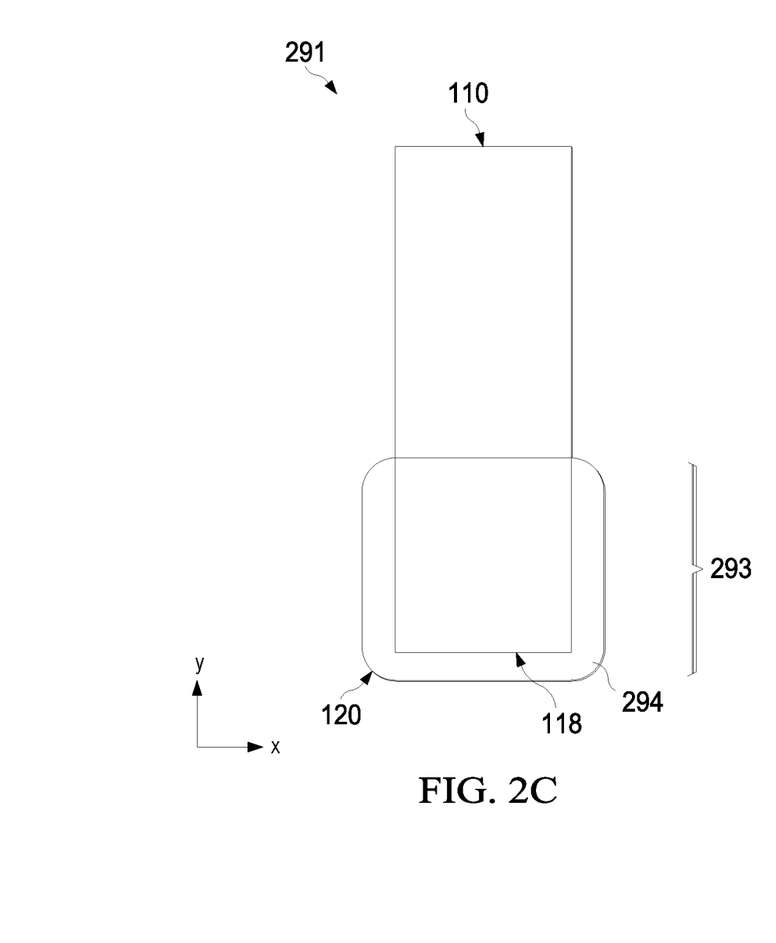
FIG. 2C is a diagram illustrating a front view of the AR lens with a blunt bottom edge according to various embodiments of the disclosure.
Figure 2D:
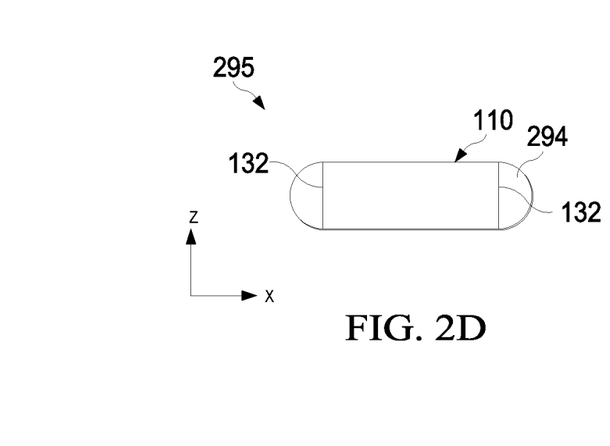
FIG. 2D is a diagram illustrating a top view of the AR lens with a blunt bottom edge according to various embodiments of the disclosure.

Referring now to FIGS. 2A-D, shown are diagrams illustrating the composition and display path of an AR lens 110 according to various embodiments of the disclosure. In particular, FIG. 2A is a diagram illustrating a side view of an AR lens 110, FIG. 2B is a ray diagram illustrating a display path within the AR lens 110, FIG. 2C is a diagram illustrating a front view of an AR lens 110 with a blunt bottom edge 120, and FIG. 2D is a diagram illustrating a top view of the AR lens 110 with a blunt bottom edge 120 according to various embodiments of the disclosure.

Referring now to FIG. 2A, shown is a diagram illustrating a side view of an AR lens 110. The AR lens 110 of FIG. 2A includes a display corrector lens 203, a main prism lens 206, and a see-through corrector lens 209. The display corrector lens 203, the main prism lens 206, and the see-through corrector lens 209 may be freeform prisms. Freeform prisms are prisms that comprise at least one freeform surface. A freeform surface is a surface that has no translational symmetry or rotational symmetry about axes normal to a mean plane. Freeform prisms provide a relatively smaller size, a relatively simpler manufacturing process, and relatively better performance characteristics compared to non-freeform prisms.

The display corrector lens 203, the main prism lens 206, and the see-through corrector lens 209 are low-dispersion lenses comprising polymethyl methacrylate (PMMA) materials or high-dispersion lenses comprising polycarbonate (PC) materials. Low-dispersion lenses have at least one positively-powered surface to converge optical waves. High-dispersion lenses have at least one negatively-powered surface to diverge optical waves.

The display corrector lens 203 provides the first optical fold of the AR lens 110 and the degrees of freedom for aberration correction and display quality improvement. The main prism lens 206 provides the second and third optical fold. The main prism lens 206 is a generally wedge-shaped lens. Together, the display corrector lens 203 and the main prism lens 206 act as a doublet to reduce chromatic aberration of images. For that purpose, either the display corrector lens 203 or the main prism lens 206 is a low-dispersion lens while the other is a high-dispersion lens.

The see-through corrector lens 209 corrects the distortion from the main prism lens 206 in a see-through path between the user's eyes and the external environment the user is viewing, and helps to form an undistorted view of the external environment. The see-through corrector lens 209 maintains a non-distorted natural FOV and counteracts distortions from the main prism lens 206 due to ambient light passing from the see-through corrector lens 209 and through the main prism lens 206. For that purpose, the main prism lens 206 and the see-through corrector lens 209 are either both low-dispersion lenses or high-dispersion lenses.

Referring now to FIG. 2B, shown is a ray diagram 210 illustrating a display path (in dashed lines) that content would take through, for example, the AR lens 110 of FIG. 2A. The ray diagram 210 shows a micro-display panel 121. As will be more fully explained below, the ray diagram 210 also depicts various surfaces of the display corrector lens 203, the main prism lens 206, and the see-through corrector lens 209 from the AR lens 110 in FIG. 2A.

The ray diagram 210 of FIG. 2B depicts first surface 220, a second surface 230, and a third surface 240 that correspond to the shape of the display corrector lens 203 of FIG. 2A. The fourth surface 250, the fifth surface 260, and the sixth surface 270 correspond to the shape of the main prism lens 206 of FIG. 2A. The seventh surface 280 and the eighth surface 290 of the ray diagram 210 in FIG. 2B correspond to the shape of the see-through corrector lens 209 of FIG. 2A.

In an embodiment, the third surface 240 of the display corrector lens 203 abuts, or faces up against, the fourth surface 250 of the main prism lens 206. For example, the third surface 240 of the display corrector lens 203 may be bonded to the fourth surface 250 of the main prism lens 206 using glue.

In operation, the micro-display panel 121 generates an image and projects the image into the display corrector lens 203. Though a single ray represents the image, the image is a combination of optical waves at different wavelengths.

The image refracts through the first surface 220, reflects off of the second surface 230, and refracts through the third surface 240 and the fourth surface 250 to enter the main prism lens 206. Then, the image reflects off of the fifth surface 260, reflects off of the sixth surface 270, refracts through the fifth surface 260, and enters a user's eye. Meanwhile, the user's FOV refracts through the eighth surface 290, the seventh surface 280, the sixth surface 270, and the fifth surface 260, to then enter the user's eye.

Referring now to FIG. 2C, shown is a diagram illustrating a front view 291 of an AR lens 110 with a blunt bottom edge 120 according to various embodiments of the disclosure. The AR lens 110 may include an optical area 293. The optical area 293 is a portion of the AR lens 110 that the user wearing the NED 100 sees through to view both the external environment surrounding the user and the image or content generated and displayed by the micro-display panel 121. In an embodiment, the optical area 293 includes a portion of the main prism lens 206, the see-through corrector lens 209, and the bottom edge 118 of the AR lens 110.

As shown by the front view 291 of the AR lens 110, when the AR lens includes a blunt bottom edge 120, a non-optical layer 294 is disposed around at least a portion of the optical area 293 of the AR lens 110. The non-optical layer 294 of the blunt bottom edge 120 is a layer of transparent or partially transparent material that does not include any of the prisms or folds that are included in the AR lens 110, as described with reference to FIGS. 2A-B.

Referring now to FIG. 2D, shown is a diagram illustrating a top view 295 of the AR lens 110 with a blunt bottom edge 120 according to various embodiments of the disclosure. As shown by FIG. 2D, the non-optical layer 294 is disposed around the sidewalls 132 of the AR lens 110.

Additional details regarding the structure and display path of the AR lens 110, implemented as a freeform lens, is further described in U.S. Patent Pub. No. 2012/0081800 and U.S. Pat. App. No. 62/789,728.

Figure 3A:
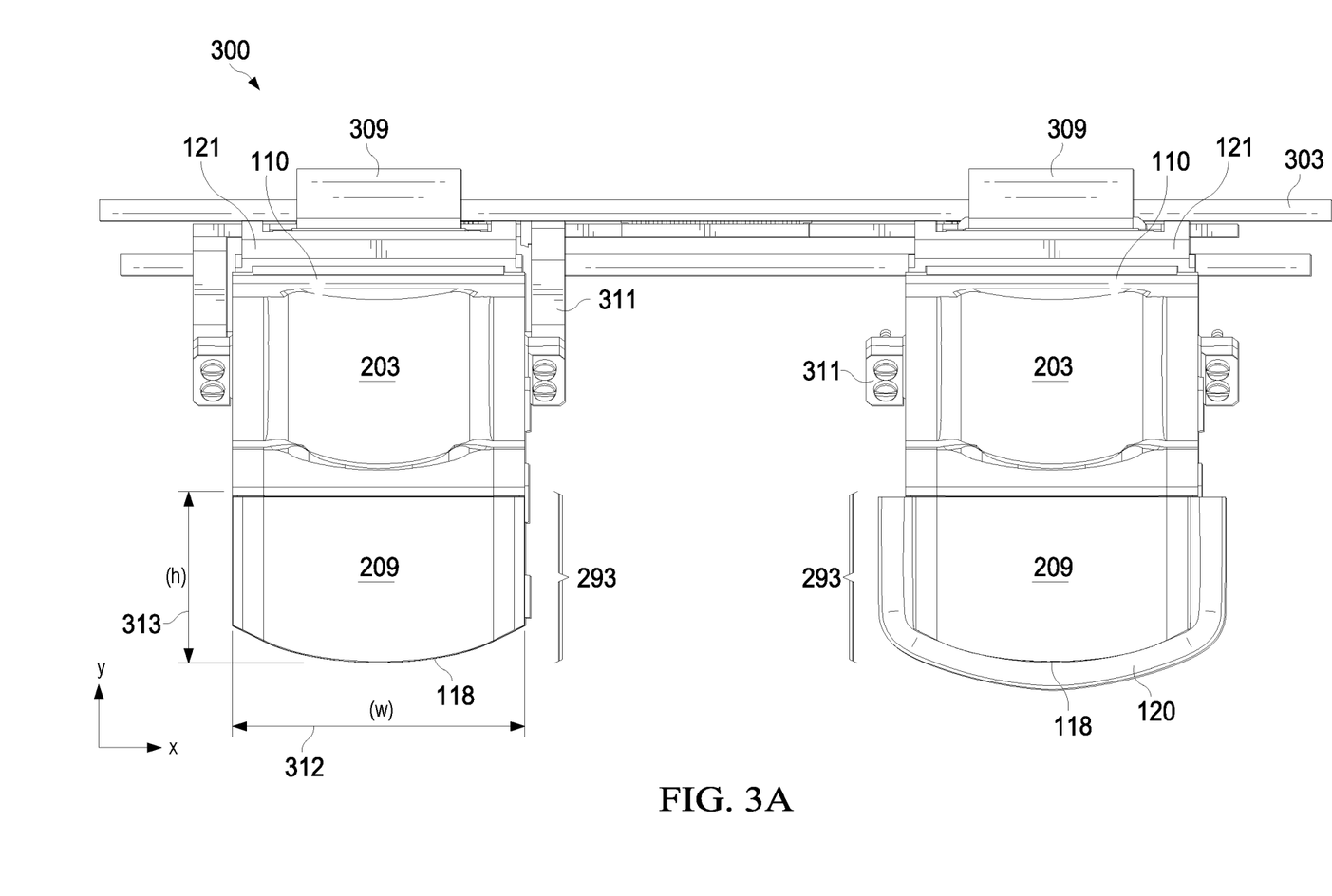
FIG. 3A is a diagram illustrating an exterior of an AR structure of the NED according to various embodiments of the disclosure.
Figure 3B:
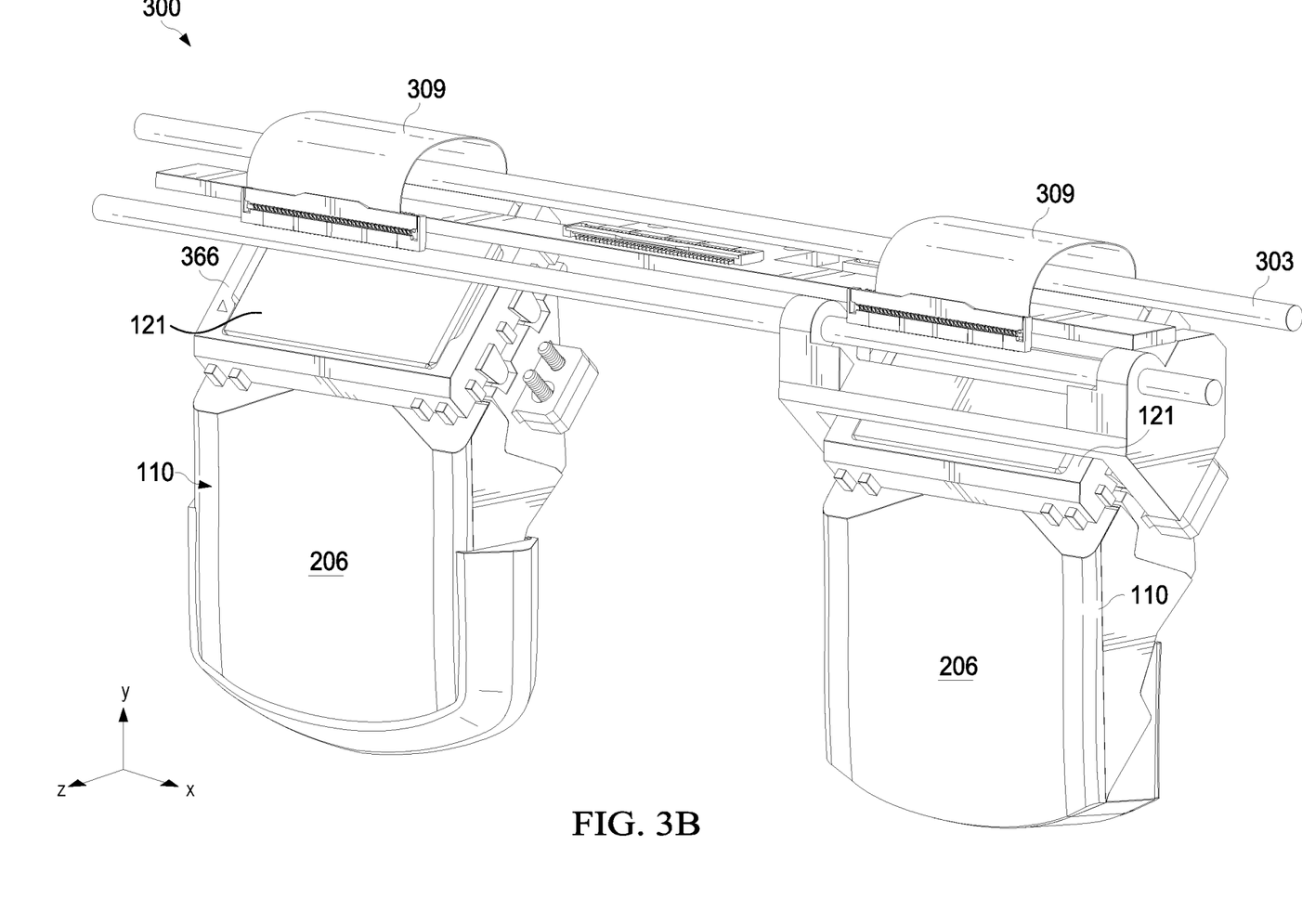
FIG. 3B is a diagram illustrating an interior of the AR structure of the NED according to various embodiments of the disclosure.

FIG. 3A is a diagram illustrating an exterior of the AR structure 300 of the NED 100 of FIG. 1 (e.g., the portion of the NED 100 facing the external environment), and FIG. 3B is a diagram illustrating an interior of the AR structure 300 of the NED 100 (e.g., the portion of the NED 100 facing the user's eyes).

Referring now to FIG. 3A, shown is a diagram illustrating an exterior of the AR structure 300 of the NED 100 of FIG. 1 according to various embodiments of the disclosure. The AR structure 300 includes the AR lens 110, a railing 303, and joints 311. The railing 303 includes one or more horizontal bars that support the AR lenses 110. The AR lenses 110 are secured to the railing 303 using the joints 311. In an embodiment, the AR lenses 110 are secured in place using the joints 311, which may include one or more screws. In an embodiment, the joints 311 each have two holes, for example, that may attach or latch onto the railing 303. The holes of the joints 311 permit the joints 311, and thus also the AR lenses 110, to slide horizontally (e.g., in the direction of the X-axis) along the railing 303. In this way, the positioning of the AR lenses 110 in a single NED 100 may be adjusted to account for different users having different pupillary distances (e.g., distance between a pupil of the user's left eye and a pupil of the user's right eye). The micro-display panel 121 is positioned above the AR lens 110 proximate to the railing 303. FIG. 3A also shows a flexible circuit board 309 that curves around the railing 303 and provides an electrical connection to various portions of the NED 100.

As described above, FIG. 3A shows an exterior of the AR structure 300 of the NED 100, which faces the exterior environment. As shown in FIG. 3A, the display corrector lens 203 is positioned above the see-through corrector lens 209 within each of the AR lenses 110. In an embodiment, the joints 311 are positioned on the sides of the display corrector lens 203.

For the NED 100 shown in FIG. 3A, the AR lens 110 on the left does not include a blunt bottom edge 120, while the AR lens 110 on the right includes the blunt bottom edge. Both the AR lenses 110 on the left and the right include the optical area 293. The optical area 293 includes the bottom edge 118 of the AR lens 110, which is proximate to the see-through corrector lens 209. The optical area 293 also includes a width 312 and a height 313. As shown by AR lens 110 on the right of the NED 100 shown in FIG. 3A, the blunt bottom edge 120 surrounds the entire width 312 and height 313 of the optical area 293.

Referring now to FIG. 3B, shown is a diagram illustrating an interior of the AR structure 300 of the NED 100 of FIG. 1 according to various embodiments of the disclosure. The interior of the AR structure 300 shown in FIG. 3B is similar to the exterior of the AR structure 300 shown in FIG. 3A, in that FIG. 3B also shows the railing 303 and the micro-display panel 121 positioned within a panel holder 366, which may be coupled to the railing 303. However, while FIG. 3A shows the portion of the NED 100 facing the external environment, FIG. 3B shows the portion of the NED 100 facing the user's eyes. Therefore, as shown in FIG. 3B, the interior of the AR structure 300 includes the main prism lens 206 of the AR lenses 110.

Figure 4A:
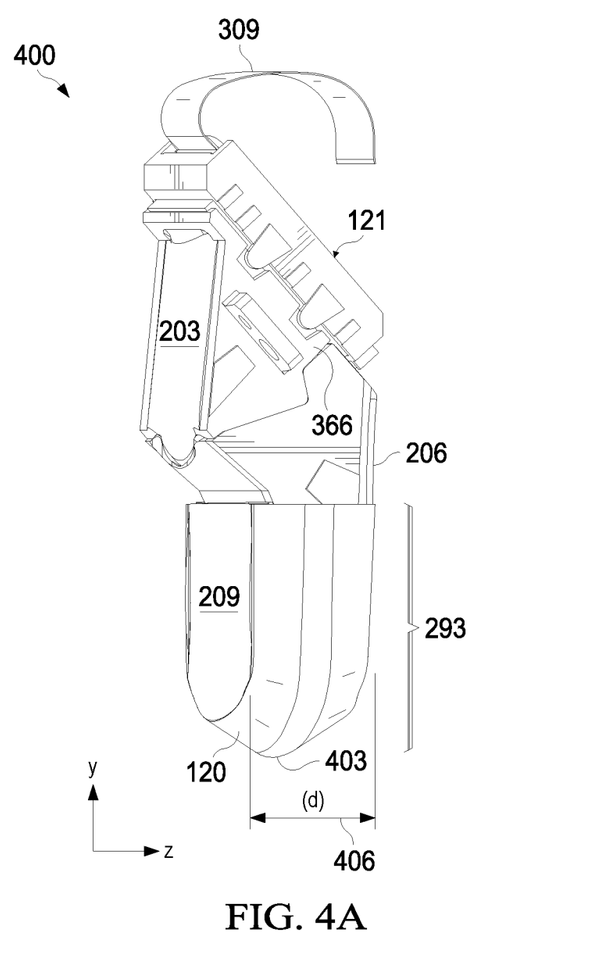
FIG. 4A is a diagram illustrating a side view of an AR lens construction with a blunt bottom edge according to various embodiments of the disclosure.
Figure 4B:
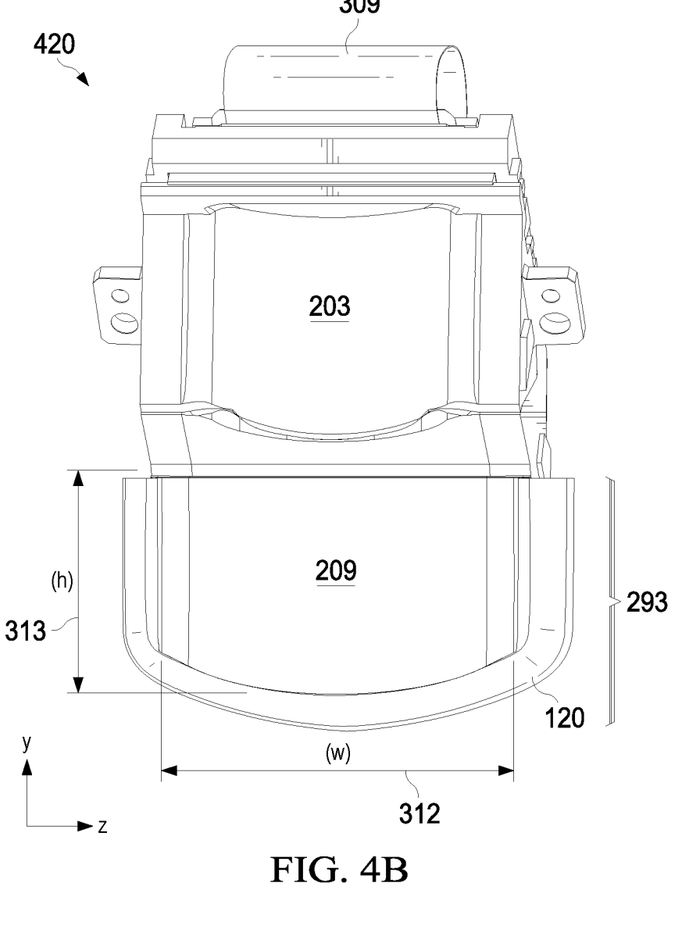
FIG. 4B is a diagram illustrating a front view of an AR lens construction with a blunt bottom edge according to various embodiments of the disclosure.

Referring now to FIGS. 4A-B, shown are diagrams illustrating various views of an AR lens 110 construction with a blunt bottom edge 120 according to various embodiments of the disclosure. In particular, FIG. 4A illustrates a side view of an AR lens 110 construction with a blunt bottom edge 120, and FIG. 4B illustrates a front view (e.g., the exterior) of an AR lens 110 construction with a blunt bottom edge 120.

Referring now to FIG. 4A, shown is a diagram illustrating a side view 400 of an AR lens 110 construction with a blunt bottom edge 120 according to various embodiments of the disclosure. The AR lens 110, which includes the display corrector lens 203, the main prism lens 206, and the see-through corrector lens 209, is coupled to or held together with the micro-display panel 121 using the panel holder 366. In an embodiment, the panel holder 366 is coupled to the AR lens 110, for example, using glue. AR lens is coupled to the joints 311, for example, using screws.

In an embodiment, the AR lens 110 includes a blunt bottom edge 120, which surrounds the edges of the optical area 293 of the AR lens 110. As described above, the optical area 293 of the AR lens 110 includes at least a portion of the main prism lens 206, the see-through corrector lens 209, and the bottom edge 118 of the AR lens 110.

In an embodiment, the blunt bottom edge 120 may taper downwards (in the Y direction) to a blunt tip 403, in a slope or angle substantially parallel to the slope or angle of a user's face around the eyes of the user. As shown by FIG. 4A, the depth 406 of the bottom most point of the AR lens 110 tapers, or diminishes gradually, to reach the blunt tip 403. In an embodiment, the blunt tip 403 is a bottom most portion of the blunt bottom edge 120. In an embodiment, the blunt tip 403 is a smoothed or rounded edge at which the depth 406 of the bottom most portion of the AR lens 110 has decreased to a minimum threshold.

Unlike the standard bottom edge 118 of the AR lens 110, the blunt bottom edge 120 does not contain any sharp edges or any edges having about a 90° angle. Instead, in an embodiment, all of the edges of the blunt bottom edge 120, including the blunt tip 403, are rounded or smoothed, so as to prevent any sharp edges from coming into contact with the face of a user and potentially injuring the user.

In this way, when a user wears or removes the NED 100 from the user's face, there are no abrupt edges on the AR lens 110 that may scratch or otherwise injure the user's eyes or face. In addition, the blunt bottom edge 120 also provides the appearance that the AR lens 110 is thinner than a typical AR lens 110. Therefore, the blunt bottom edge 120 of the AR lens 110 reduces the apparent thickness of the AR lens 110, while also enabling a more comfortable user experience when handling the NED 100.

In an embodiment, the blunt bottom edge 120 tapers, or diminishes, downwards to reach the blunt tip 403, which may be a point at the blunt tip 403. In an embodiment, the point on the blunt tip 403 may still be smoothed or blunt so as to prevent scratching the user's face while reducing the apparent thickness of the AR lens 110.

Referring now to FIG. 4B, shown is an exterior side view 420 of the AR lens 110 construction according to various embodiments of the disclosure. The exterior side view 420 of the AR lens 110 construction shown in FIG. 4B is the side of the AR structure 300 facing the exterior environment (as described above with regard to FIG. 3A). The exterior side view 420 shows that the blunt bottom edge 120 not only tapers downwards (or longitudinally) at the bottom edge 118 of the optical area 293 with respect to the Y-axis along the width 312 of the optical area 293 to a blunt tip 403, but also smoothed horizontally (or latitudinally) at the sidewalls 132 of the optical area 293 with respect to the X-axis along the height 313 of the optical area 293.

The blunt bottom edge 120 of the AR lens 110 can either be constructed directly as the bottom edge of the AR lens 110 or can be a separate attachment that is coupled to the bottom edge of the AR lens 110. In a first embodiment, the optical area 293 is post-processed or polished around the edges to taper the edges of the optical area 293.

In a second embodiment, a beveled edge, which is separate from the AR lens 110 and further described below with reference to FIGS. 5A-D, is attached to the bottom edge 118 of the AR lens 110 to create the blunt bottom edge 120. In this embodiment, the beveled edge can be molded using plastic injection molding and then attached to the bottom edge 118 of the AR lens 110 using glue.

Figure 5A:
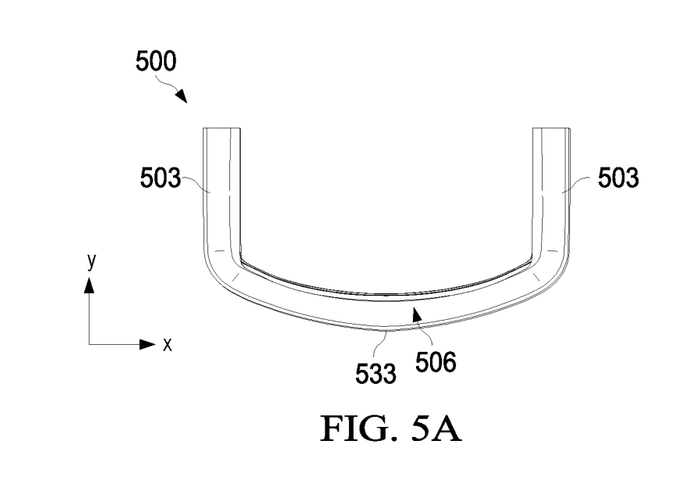
FIGS. 5A-D are diagrams illustrating various views of a beveled edge that may be attached to the bottom edge of the AR lens to create the blunt bottom edge according to various embodiments of the disclosure.

Referring now to FIGS. 5A-D, shown are various views of a beveled edge 500 that is to be attached to the bottom edge 118 of the AR lens 110 to create the blunt bottom edge 120 according to various embodiments of the disclosure. FIG. 5A shows a front view of the beveled edge 500 according to various embodiments of the disclosure. In an embodiment, the beveled edge 500 is a U-shaped insert that may be attached to the bottom edge 118 of the AR lens 110. The beveled edge 500 comprises two sides 503 and a bottom surface 506. Similar to the blunt bottom edge 120 described above with reference to FIGS. 4A-B, the beveled edge 500 is tapered to downwards to a rounded bottom surface 533, which is a rounded or smooth edge. The beveled edge 500 is tapered in a slope or angle substantially parallel to the slope or angle of a user's face around the eyes of the user. In an embodiment, the bottom surface 506 of the bevel 500 tapers downwards with respect to the Y-axis. In an embodiment, the sides 503 each taper with respect to the X-axis. As shown by FIG. 5A, the left side 503 tapers off to the left horizontally in the X direction, and the right side 503 tapers off to the right horizontally in the X direction.

Figure 5B:
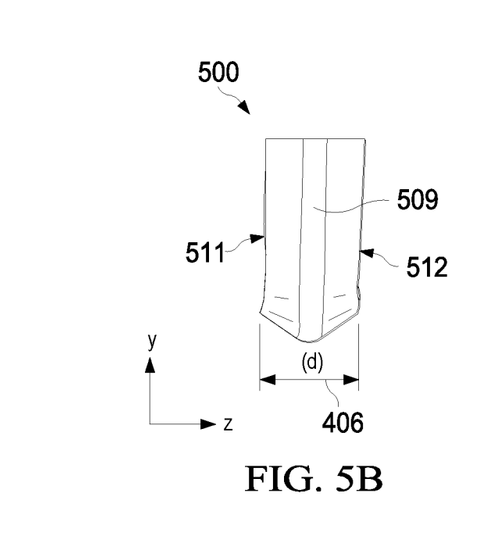

FIG. 5B shows a side view of the beveled edge 500 according to various embodiments of the disclosure. The beveled edge 500 tapers out, down, and around the edges to gradually reduce the depth 406 of the beveled edge 500 with respect to the Z-axis. As shown by FIG. 5B, the beveled edge 500 tapers or slopes from the sides 511 and 512 to create a ridge 509. The ridge 509 is a rounded and smooth edge that wraps around the sides 503 and the bottom surface 506 of the beveled edge 500. The ridge 509 is at a substantially obtuse angle, so as to prevent a sharp edge from existing at the bottom of the beveled edge 500.

Figure 5C:
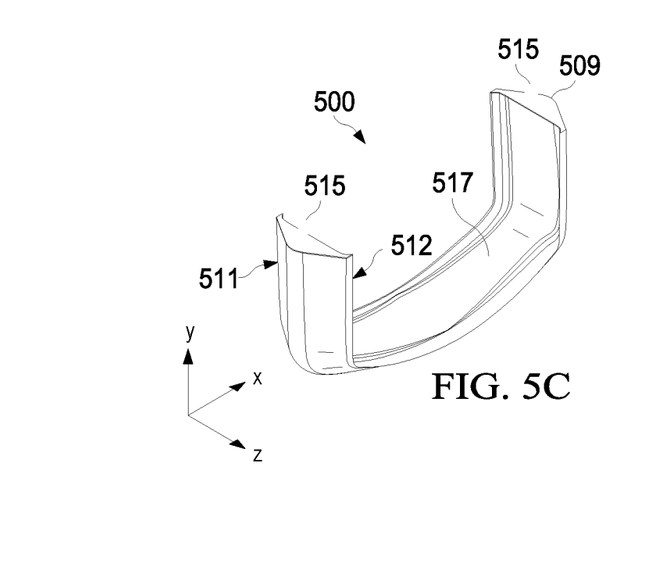

FIG. 5C is a diagram illustrating a top view of the beveled edge 500 according to various embodiments of the disclosure. As shown by FIG. 5C, the beveled edge 500 is in the shape of a triangular prism, and thus may include triangular ends 515. The beveled edge 500 tapers or slopes from the sides 511 and 512 to create the ridge 509. FIG. 5C further shows the internal surface 517 of the beveled edge 500. In an embodiment, the internal surface 517 is glued to the bottom edge 118 of the AR lens 110. For example, the internal surface 517 is molded using plastic injection molding and glued to the bottom edge 118 of the AR lens 110 using glue.

Figure 5D:
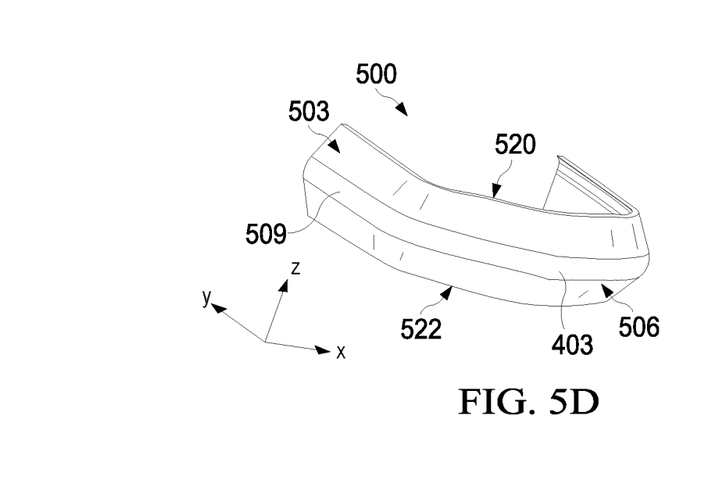

FIG. 5D is a diagram illustrating a bottom view of the beveled edge 500 according to various embodiments of the disclosure. Particularly, FIG. 5D shows the bottom surface 506 and a side 503 of the beveled edge 500. As shown by FIG. 5D, the bottom surface 506 tapers down from two edges 520 and 522 with respect to the Y-axis to form the ridge 509 and the blunt tip 403.

In an embodiment, the beveled edge 500 is made of material similar to that described above with reference to the blunt bottom edge 120. For example, the beveled edge 500 is made of substantially transparent plastic or polycarbonate material. In the embodiments of the beveled edge 500 shown in FIGS. 5A-D, the tapering of the edges and the ridge 509 protect the user from the sharp edges of the AR lens 110 while enabling the AR lens 110 to appear thinner and more appealing to the eye.

While FIGS. 5A-D are described to be a beveled edge 500 that is separate and attached to the bottom edge 118 to form a blunt bottom edge 120 of the AR lens 110, the AR lens 110 itself may be post processed to include a blunt bottom edge 120 substantially similar to the beveled edge 500. In this sense, the blunt bottom edge 120, which is not part of the original AR lens 110 and not glued onto the AR lens 110, has the same ridge 509 that wraps around the optical area 293 of the AR lens 110. While FIGS. 5A-D show a beveled edge 500 in the shape of a triangular prism, the beveled edge 500 may be in any other shape so long as the beveled edge 500 tapers down with respect to the Y-axis and to the sides with respect to the X-axis.

Figure 6A:
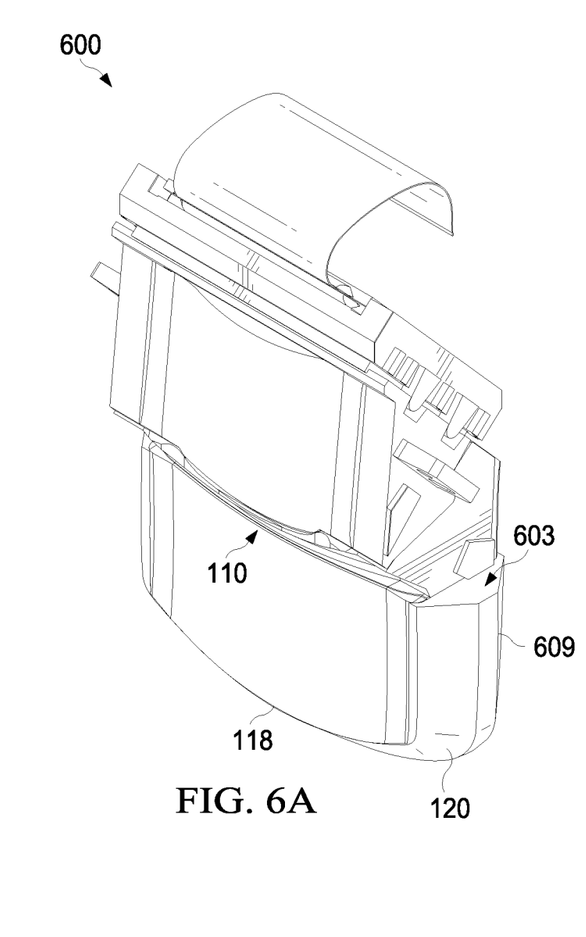
FIGS. 6A-B are diagrams illustrating various views of an AR lens construction with a blunt bottom edge shaped as a trapezoidal prism according to various embodiments of the disclosure.
Figure 6B:
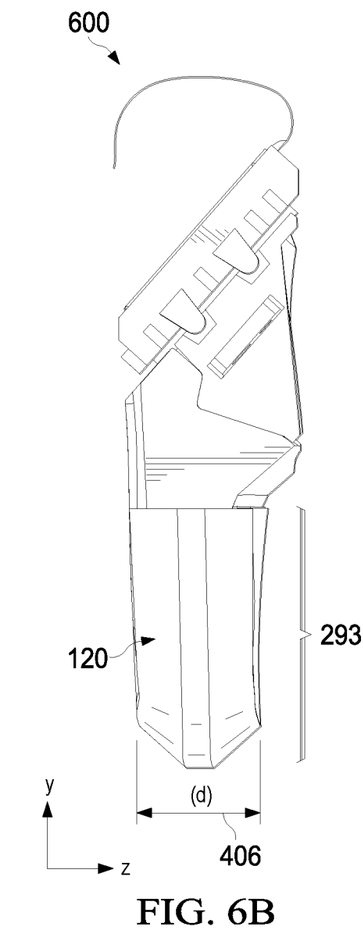

Referring now to FIGS. 6A-B, shown are diagrams illustrating various views of an AR lens 110 construction with a blunt bottom edge 120 shaped as a trapezoidal prism 600 according to various embodiments of the disclosure. The blunt bottom edge 120 shaped as a trapezoidal prism 600 may be formed as part of the AR lens 110. Alternatively, the blunt bottom edge 120 shaped as a trapezoidal prism 600 may be a separate beveled edge, such as beveled edge 500, that may be attached to or glued onto the bottom edge 118 of the AR lens 110.

As shown by FIG. 6A, the blunt bottom edge 120 that wraps around the AR lens 110 is shaped as a trapezoidal prism 600 includes trapezoidal ends 603 and a trapezoidal plane 609. As shown by FIG. 6A, the blunt bottom edge 120 tapers or slopes from the sides to create a trapezoidal plane 609. Similar to the ridge 509, the trapezoidal plane 609 is a flat surface that wraps around the sides and the bottom surface of the blunt bottom edge 120. In an embodiment, the trapezoidal plane 609 may have a minimum threshold depth with respect to the Z-axis.

As shown by FIG. 6B, the blunt bottom edge 120 shaped as a trapezoidal prism 600 that is tapered out, down, and around the edges of the optical area 293 to gradually reduce the depth 406 of the blunt bottom edge 120 with respect to the Z-axis, similar to the beveled edge 500. In the embodiments of the blunt bottom edge 120 shown in FIGS. 6A-B, the tapering, smoothing, or rounding of the edges and the trapezoidal plane 609 protect the user from the sharp edges of the AR lens 110 while enabling the AR lens 110 to appear thinner and more appealing to the eye.

Figure 7A:
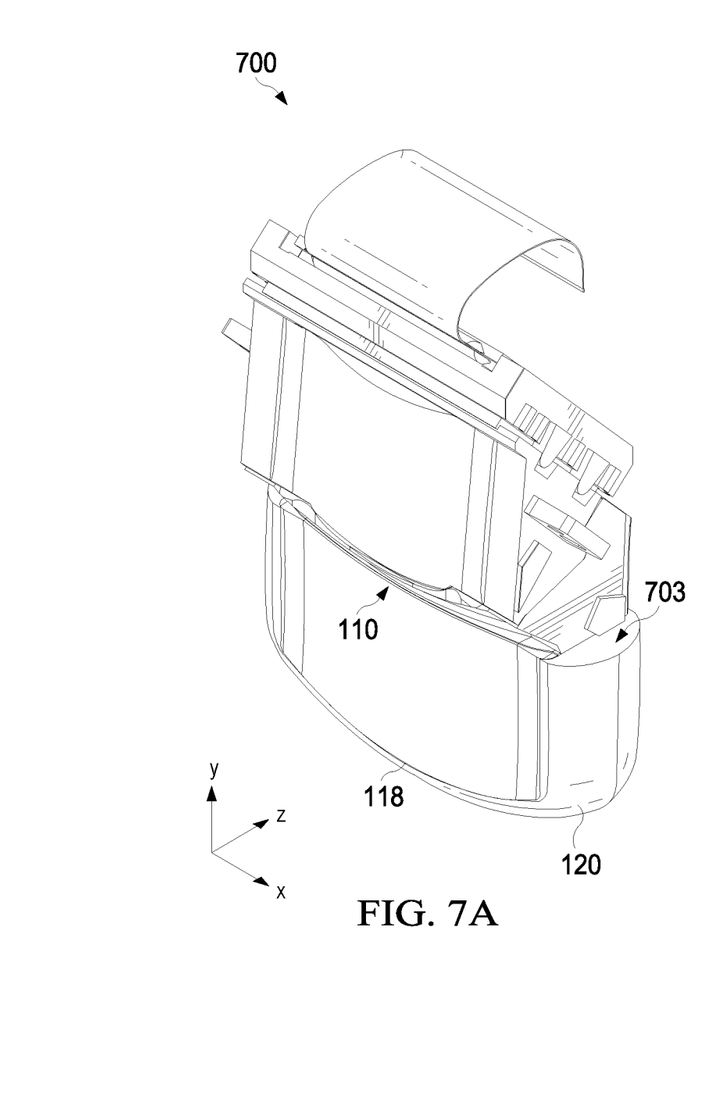
FIGS. 7A-B are diagrams illustrating various views of an AR lens construction with a blunt bottom edge shaped as a semi-hemisphere according to various embodiments of the disclosure.
Figure 7B:
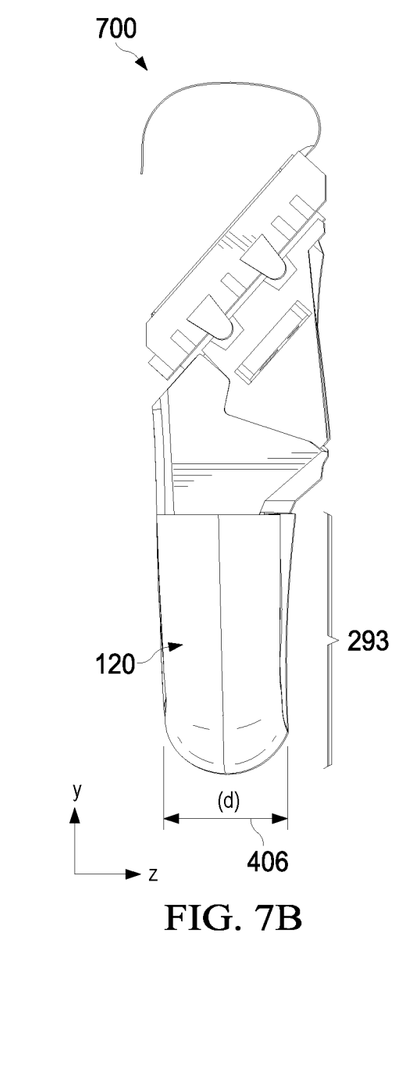

Referring now to FIGS. 7A-B, shown are diagrams illustrating various views of an AR lens 110 construction with a blunt bottom edge 120 shaped as a semi-hemisphere 700 according to various embodiments of the disclosure. The blunt bottom edge 120 shaped as a semi-hemisphere 700 may be formed as part of the AR lens 110. Alternatively, the blunt bottom edge 120 shaped as a semi-hemisphere 700 may be a separate beveled edge, such as beveled edge 500, that may be attached or glued onto the bottom surface 118 AR lens 110.

As shown by FIG. 7A, the blunt bottom edge 120 shaped as a semi-hemisphere 700 includes semi-circular ends 703. As shown by FIG. 6A, the blunt bottom edge 120 is tapered or rounded from the sides to create a semi-hemisphere or dome shape along the edges of the optical area 293.

As shown by FIG. 7B, the blunt bottom edge 120 shaped as a blunt bottom edge 120 tapered to a rounded in a convex shape out, down, and around the edges of the optical area 293 to gradually reduce the depth 406 of the blunt bottom edge 120 in the Z direction, similar to the beveled edge 500. In the embodiments of the blunt bottom edge 120 shown in FIGS. 7A-B, the semi-hemisphere 700 or dome shape of the blunt bottom edge 120 protect the user from the sharp edges of the AR lens 110 while enabling the AR lens 110 to appear thinner and more appealing to the eye.

Figure 8:
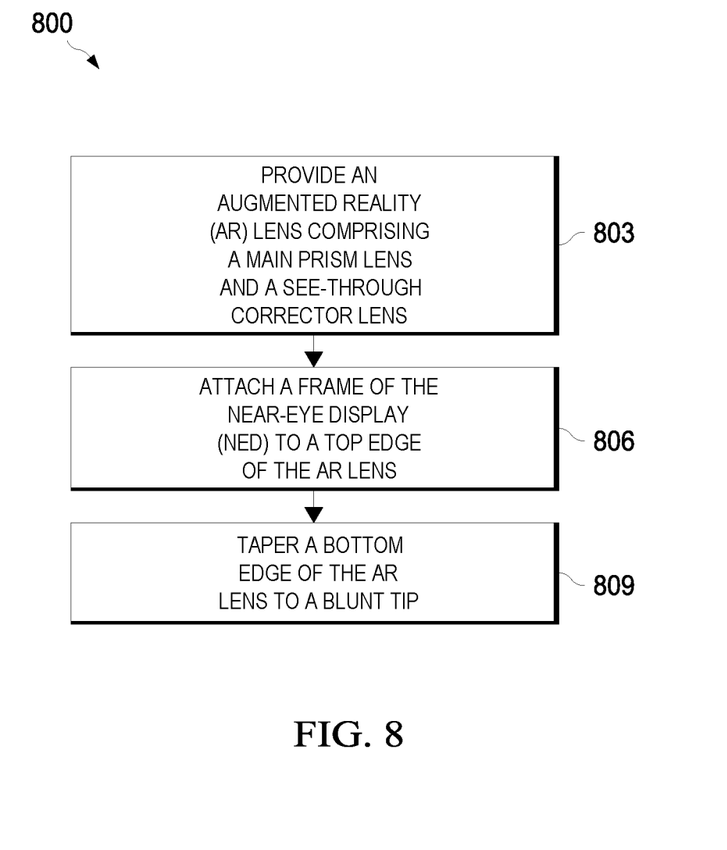
FIG. 8 is a flowchart illustrating a method for manufacturing an NED with AR lenses having blunt bottom edges according to various embodiments of the disclosure.

FIG. 8 is a flowchart illustrating a method 800 for manufacturing an NED 100 according to various embodiments of the disclosure. A manufacturer implements the method 800. Alternatively, multiple manufacturers implement the method 800. In an embodiment, method 800 may be implemented after the frame 103 of the NED 100 has been molded together to include at least the component parts shown and described above with reference to FIGS. 1A-B and 2A-B.

At step 803, the AR lens 110 is constructed and provided, in which the AR lens 110 includes at least the main prism lens 206 and the see-through corrector lens 209. In an embodiment, the AR lens 110 is constructed similar to the manner described above with reference to FIGS. 2A-D. In an embodiment, the AR lens 110 also includes the display corrector lens 203, in which the main prism lens 206 is positioned substantially in between the display corrector lens 203 and the see-through corrector lens 209.

At step 806, the AR lens 110 is attached to a frame 103 of the NED 100. For example, a top edge of the AR lens 110, which is the edge opposite to the bottom edge 118 and proximate to the display corrector lens 203, is attached to a frame 103 of the NED 100. In an embodiment, the AR lens 110 is attached to the frame 103 of the NED 100 using screws. For example, a manufacturer uses screws to attach the top edge of the AR lens 110 to the frame 103 of the NED 100.

At step 809, an optical area 293 of the AR lens 110 proximate to the see-through corrector lens 209 is smoothed or rounded to create a blunt bottom edge. In one embodiment, the AR lens 110 is constructed with smoothed or rounded edges on the sides and bottom surface of the optical area 293 of the AR lens 110. For example, a manufacturer polishes the sides and bottom surface of the optical area 293 of the AR lens 110 to taper the optical area 293 of the AR lens 110. In another embodiment, a beveled edge 500, which may be constructed as a triangular prism (see FIG. 5), trapezoidal prism (see FIG. 6), or semi-hemisphere (see FIG. 7), may be coupled to the bottom edge 118 of the AR lens 110. For example, a manufacture attaches the beveled edge 500 made using plastic injection molding to the bottom edge 118 of the AR lens 110 using glue.

In an embodiment, an apparatus comprises an AR lens 110 comprising a main prism lens 206 and a see-through corrector lens 209. In an embodiment, the AR lens comprises a bottom edge 118 proximate to the see-through corrector lens 209. In an embodiment, the bottom edge 118 of the AR lens 110 is smoothed or rounded to form a blunt bottom edge 120. In an embodiment, a micro-display panel 121 is coupled to the AR lens 110 and comprises a processor 123 configured to process content for display to a user wearing the NED 100, and a display 122 coupled to the processor 123 and configured to project the content to the AR lens 110.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A near-eye display (NED), comprising:
    an augmented reality (AR) lens comprising a main prism lens and a see-through corrector lens, wherein the AR lens comprises an optical area that displays content and light from an external environment to a user, wherein the optical area comprises a portion of the main prism lens and the see-through corrector lens, wherein a bottom edge of the optical area that comprises the portion of the main prism lens and the see-through corrector lens tapers toward a blunt tip; and
    a micro-display panel coupled to the AR lens and comprising:
    a processor configured to process the content for display to the user wearing the NED; and
    a display coupled to the processor and configured to project the content to the AR lens.

2. The NED of claim 1, wherein two sides of the bottom edge of the optical area and an entire length of the bottom edge of the optical area are tapered.

3. The NED of claim 1, wherein the optical area of the AR lens comprises a transparent plastic material.

4. The NED of claim 1, wherein the bottom edge is tapered as a triangular prism, a trapezoidal prism, or a semi-hemisphere.

5. The NED of claim 1, wherein the bottom edge of the optical area is detachably attached to a beveled edge that tapers.

6. The NED of claim 5, wherein the beveled edge at least partially surrounds the optical area of the AR lens.

7. The NED of claim 1, wherein the content passes through a display corrector lens of the AR lens and the main prism lens, before being presented to the user with light from the external environment.

8. The NED of claim 1, wherein a depth of the bottom edge of the optical area is less than a depth of the AR lens.

9. The NED of claim 1, wherein the main prism lens abuts the see-through corrector lens within the optical area of the AR lens.

10. A method for manufacturing a near-eye display (NED), comprising:
    providing an augmented reality (AR) lens comprising a main prism lens and a see-through corrector lens, wherein the AR lens comprises an optical area that displays content and light from an external environment to a user, wherein the optical area comprises a portion of the main prism lens and the see-through corrector lens;
    attaching a frame of the NED to the AR lens; and
    tapering a bottom edge of the optical area comprising the portion of the main prism lens and the see-through corrector lens to a blunt tip.

11. The method of claim 10, wherein tapering the bottom edge of the optical area comprises: tapering a portion of the bottom edge of the optical area that is proximate to the see-through corrector lens by attaching a beveled edge to the optical area.

12. The method of claim 11, wherein the beveled edge is attached to the optical area of the AR lens using glue.

13. The method of claim 10, wherein tapering the bottom edge of the optical area comprises: tapering a portion of the bottom edge of the optical area that is proximate to the see-through corrector lens by polishing sides and the bottom edge of the optical area.

14. A near-eye display (NED), comprising:
    an augmented reality (AR) lens comprising a display corrector lens, a main prism lens, and a see-through corrector lens, wherein the AR lens comprises an optical area that displays content and light from an external environment to a user, wherein the optical area comprises a portion of the main prism lens and the see-through corrector lens, wherein a bottom edge of the optical area that comprises the portion of the main prism lens and the see-through corrector lens tapers towards a blunt tip; and
    a micro-display panel coupled to the AR lens and comprising a processor configured to process the content for display to the user wearing the NED though the AR lens.

15. The NED of claim 14, wherein two sides of the bottom edge of the optical area and an entire width of the bottom edge of the isoptical area are tapered.

16. The NED of claim 15, wherein the optical area of the AR lens comprises a transparent plastic material.

17. The NED of claim 14, wherein the bottom edge is tapered as a triangular prism, a trapezoidal prism, or a semi-hemisphere.

18. The NED of claim 14, wherein the optical area of the AR lens is detachably attached to a beveled edge that tapers at the bottom edge of the AR lens.

19. The NED of claim 18, wherein the beveled edge at least partially surrounds the optical area of the AR lens.

20. The NED of claim 18, wherein the main prism lens abuts the see-through corrector lens within the optical area of the AR lens.

* * * * *